United States Patent
Panas

(10) Patent No.: US 11,919,244 B2
(45) Date of Patent: Mar. 5, 2024

(54) SYSTEM AND METHOD FOR IN SITU VOLUMETRIC SENSING OF 3D CURE STATE OF RESIN BEING USED IN AN ADDITIVE MANUFACTURING SYSTEM

(71) Applicant: Lawrence Livermore National Security, LLC, Livermore, CA (US)

(72) Inventor: Robert Matthew Panas, Dublin, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 801 days.

(21) Appl. No.: 16/685,500

(22) Filed: Nov. 15, 2019

(65) Prior Publication Data
US 2021/0146628 A1    May 20, 2021

(51) Int. Cl.
*B29C 64/393* (2017.01)
*B29C 64/241* (2017.01)
(Continued)

(52) U.S. Cl.
CPC .......... *B29C 64/393* (2017.08); *B29C 64/241* (2017.08); *B29C 64/255* (2017.08);
(Continued)

(58) Field of Classification Search
CPC ... B29C 64/255; B29C 64/393; B29C 64/241; G02B 6/3512; B33Y 10/00; B33Y 50/02; B33Y 30/00
See application file for complete search history.

(56) References Cited

U.S. PATENT DOCUMENTS

| 5,009,102 A * | 4/1991 | Afromowitz .......... G01N 25/02 |
| | | 73/590 |
| 2006/0044555 A1 * | 3/2006 | Wang ................. G01N 21/6402 |
| | | 356/318 |

(Continued)

FOREIGN PATENT DOCUMENTS

| CN | 106273477 A | 1/2017 |
| CN | 109752401 A | 5/2019 |

(Continued)

OTHER PUBLICATIONS

Damien Loterie et al. "Volumetric 3D Printing of Elastomers by Tomographic Back-Projection", https://www.researchgate.net/publication/328956954 (2018), 10 pages.

(Continued)

*Primary Examiner* — Thomas C Lee
*Assistant Examiner* — Ameir Myers
(74) *Attorney, Agent, or Firm* — HARNESS, DICKEY & PIERCE, P.L.C.

(57) ABSTRACT

An in situ cure monitoring control system for use with a volumetric three dimensional (3D) printing system, wherein the volumetric 3D system includes a container defining a build volume, the container includes a photocurable resist used for making a 3D part, and the resist is responsive to an optical curing beam from a light source, which is controlled by a controller, and which is passed through the resist. The cure monitoring control system includes an optical signal source which generates optical signals having a wavelength selected in relation to a characteristic of the resist, and directed to pass through the build volume. A detector detects the optical signals and generates output signals in accordance therewith. Software monitors the output signals and uses the output signals to modify the curing beam to help optimize curing of the resist.

19 Claims, 5 Drawing Sheets

(51) Int. Cl.
- *B29C 64/255* (2017.01)
- *B33Y 10/00* (2015.01)
- *B33Y 50/02* (2015.01)
- *G02B 6/35* (2006.01)
- *B33Y 30/00* (2015.01)

(52) U.S. Cl.
CPC ............ *G02B 6/3512* (2013.01); *B33Y 10/00* (2014.12); *B33Y 30/00* (2014.12); *B33Y 50/02* (2014.12)

(56) References Cited

U.S. PATENT DOCUMENTS

| | | |
|---|---|---|
| 2009/0051935 A1 | 2/2009 | Cooper |
| 2014/0002558 A1* | 1/2014 | Ramesh ............ B41J 11/00212 347/102 |
| 2017/0090462 A1 | 3/2017 | Dave et al. |
| 2018/0015672 A1 | 1/2018 | Shusteff et al. |
| 2018/0250890 A1 | 9/2018 | Claussen et al. |
| 2019/0016052 A1 | 1/2019 | Clark |
| 2019/0259146 A1* | 8/2019 | Hunt .................. H04N 23/56 |
| 2020/0173964 A1* | 6/2020 | Hudson .............. G01N 29/0645 |
| 2021/0129423 A1* | 5/2021 | Matusik ................ B29C 64/112 |
| 2021/0146628 A1 | 5/2021 | Panas |
| 2021/0291460 A1* | 9/2021 | Clark .................... B29C 64/393 |
| 2022/0143906 A1* | 5/2022 | Zhao .................... B29C 64/393 |

FOREIGN PATENT DOCUMENTS

| | | |
|---|---|---|
| EP | 3459716 A1 | 3/2019 |
| WO | WO-2017197388 A1 | 11/2017 |

OTHER PUBLICATIONS

Brett E. Kelly et al. "Volumetric Additive Manufacturing Via Tomographic Reconstruction", Science 363, No. 6431 (2019), pp. 1075-1079.

Computed Axial Lithography (CAL): Toward Single Step 3D Printing of Arbitrary Geometries, https://arxiv.org/abs/1705.05893v1, May 16, 2017, 10 pages.

Maxim Shusteff et al. "One-step volumetric additive manufacturing of complex polymer structures", Sci. Adv. No. 3, Dec. 3, 2017, 7 pages.

International Search Report and Written Opinion regarding International Application No. PCT/US2020/053917, dated Mar. 26, 2021.

Kumar, A., Kuang, Y., Liang, Z. and Sun, X., 2020. Microwave chemistry, recent advancements and eco-friendly microwaves-sisted synthesis of nanoarchitectures and their applications: A review. Materials Today Nano, 11, p. 100076.

Boey, F.Y.C. and Yap, B.H., 2001. Microwave curing of an epoxy-amine system: effect of curing agent on the glass-transition temperature. Polymer testing, 20(8), pp. 837-845.

Tanrattanakul, V. and Saetiaw, K., 2005. Comparison of microwave and thermal cure of epoxy-anhydride resins: Mechanical properties and dynamic characteristics. Journal of Applied Polymer Science, 97(4), pp. 1442-1461.

Zhao, J., Yang, Y. and Li, L., 2020. A comprehensive evaluation for different post-curing methods used in stereolithography additive manufacturing. Journal of Manufacturing Processes, 56, pp. 867-877.

Sweeney, C.B., Lackey, B.A., Pospisil, M.J., Achee, T.C., Hicks, V.K., Moran, A.G., Teipel, B.R., Saed, M.A. and Green, M.J., 2017. Welding of 3D-printed carbon nanotube-polymer composites by locally induced microwave heating. Science advances, 3(6), p. e1700262.

Odom, M.G., Sweeney, C.B., Parviz, D., Sill, L.P., Saed, M.A. and Green, M.J., 2017. Rapid curing and additive manufacturing of thermoset systems using scanning microwave heating of carbon nanotube/epoxy composites. Carbon, 120, pp. 447-453.

Iliopoulos, A.P., Michopoulos, J.G., Steuben, J.C., Birnbaum, A.J., Graber, B.D., Rock, B.Y., Johnson, L.A. and Gorzkowski, E.P., Aug. 2019, Towards Selective Volumetric Additive Manufacturing and Processing of Ceramics. In International Design Engineering Technical Conferences and Computers and Information in Engineering Conference (vol. 59179, p. V001T02A036). American Society of Mechanical Engineers.

Ebner, C., Bodner, T., Stelzer, F. and Wiesbrock, F., 2011. One Decade of Microwave-Assisted Polymerizations: Quo vadis?. Macromolecular rapid communications, 32(3), pp. 254-288.

International Search Report and Written Opinion, International Application No. PCT/US2022/047358, dated Feb. 22, 2023, 7 pages.

* cited by examiner

SYSTEM AND METHOD FOR IN SITU VOLUMETRIC SENSING OF 3D CURE STATE OF RESIN BEING USED IN AN ADDITIVE MANUFACTURING SYSTEM

STATEMENT OF GOVERNMENT RIGHTS

The United States Government has rights in this invention pursuant to Contract No. DE-AC52-07NA27344 between the U.S. Department of Energy and Lawrence Livermore National Security, LLC, for the operation of Lawrence Livermore National Laboratory.

FIELD

The present disclosure relates to additive manufacturing systems and methods, and more particularly to a system and method for sensing, in situ, a cure state of a resist (i.e., resin) being used in an additive manufacturing operation using optical Computed Tomographic (CT) images throughout a printing operation.

BACKGROUND

The statements in this section merely provide background information related to the present disclosure and may not constitute prior art.

Volumetric additive manufacturing (AM) is a recently developed concept. For example, see the work of Loterie, Damien, Paul Delrot, and Christophe Moser, "VOLUMETRIC 3D PRINTING OF ELASTOMERS BY TOMOGRAPHIC BACK-PROJECTION" https://www.researchgate.net/publication/328956954 (2018). Another example of volumetric AM is Kelly, Brett E., Indrasen Bhattacharya, Hossein Heidari, Maxim Shusteff, Christopher M. Spadaccini, and Hayden K. Taylor, "Volumetric additive manufacturing via tomographic reconstruction," Science 363, no. 6431 (2019): 1075-1079. Volumetric AM has shown significant promise in accelerating the rate of polymer-based additive manufacturing, among many other benefits.

Volumetric printing is carried out over a 3D volume simultaneously rather than building up a 3D structure (i.e., part or component) via scanned point or 2D-surface curing operations. Volumetric AM also provides a means to improve surface roughness owing to the simultaneous curing operation.

These present day volumetric AM printing systems operate in open loop fashion, which means the printer estimates the input signals required to generate the desired volumetric curing map, then proceeds to print using the initial predictions. These predictions have great difficulty handling the nonlinear optical response of the material, particularly as it moves from the uncured to the cured state. Errors or uncertainty in the modeling, as well as variation in material optical properties during the curing process, result in errors in the volumetric intensity map applied by the volumetric AM printing system. The volumetric intensity map determines the volumetric curing map within the resist, and thus the final cured geometry. This means that errors and variation in the volumetric intensity map then translate into errors in the final geometry of the cured part or structure. Open loop operation is not able to account for these errors since there is no feedback to observe the errors occurring in real time.

Owing to the complexity of the interactions during the volumetric AM printing build operation, the open loop operation frequently results in less than optimum precision parts. Even if the resist chemistry and material properties were known to high precision, such information would only be accurate for the studied chemistry. Even fine variations in the batch of resist or the printing environment could throw off the tuning, resulting in poor part production in the open loop printing/curing operation.

The sensitivity of the volumetric AM process would thus benefit greatly from a different approach that is able to provide a significantly higher level of determinism. More particularly, an approach which is able to provide for real time feedback on how curing is occurring during the build process would provide the opportunity to modify a cure map, in real time, as a part is being cured. This would have the potential to significantly improve the quality of parts produced in a volumetric AM printing operation.

SUMMARY

This section provides a general summary of the disclosure, and is not a comprehensive disclosure of its full scope or all of its features.

In one aspect the present disclosure relates to an in situ cure monitoring control system for use with a volumetric three dimensional (3D) printing system, wherein the volumetric 3D system includes a container defining a build volume, the container includes a photocurable resist used for making a 3D part, and the resist is responsive to an optical curing beam from a light source which is controlled by a controller, and which is passed through the resist. The cure monitoring control system may comprise an optical signal source configured to generate optical signals having a wavelength selected in relation to a characteristic of the resist, and directed to pass through the build volume as the curing beam is also passing through the resist. A detector may be included which detects the optical signals after the optical signals have passed through the resist and generates output signals in accordance therewith. Software is used which is configured to communicate with the controller, and to monitor the output signals and to use the output signals to modify the curing beam to help optimize curing of the resist.

In another aspect the present disclosure relates to a volumetric three dimensional (3D) printing system. The system may comprise a controller, a container defining a build volume for holding a quantity of optically curable resist used to form a 3D component, and a rotatable stage for supporting the container and rotating the container. The system may further include a light generating source controlled by the controller which generates an optical curing beam which is projected through the resist. The optical curing beam projects a plurality of two dimensional (2D) images for selectively photo-curing the resist to form the 3D component. A cure monitoring control subsystem is included which is configured to communicate with the controller for in situ monitoring a curing of the resist and generating data useful for modifying the optical curing beam to help control curing of the 3D component.

In still another aspect the present disclosure relates to a method for controlling, in situ, curing of a resist being used to form a three dimensional (3D) part through a volumetric three dimensional (3D) printing operation. The method may comprise projecting an optical signal through a build volume, wherein the build volume includes the resist. The method may further include detecting the optical signal after the optical signal has passed through the build volume, while the resist is being cured using a curing beam being projected through the resist. The method may further include analyzing a characteristic of the detected optical signal in real time to determine how curing of the resist is proceeding. The method may further include using the analysis of the characteristic of the detected optical signal to modify a property of the curing beam in real time to help optimize curing of the resist.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

The present disclosure is directed to new systems and methods for sensing, in real-time, the 3D cure state of a resist (i.e., resin) within a volumetric additive manufacturing system. The present disclosure involves systems and methods that make use of emitters and sensors that are added to a basic tomographic AM system, and which enable the generation of optical Computed Tomography (CT) images throughout a volumetric additive manufacturing (AM) printing operation. The resulting 3D CT images provide a map of the curing state of the resist within the build volume, and are used for real time feedback during the build process to ensure the proper curing pattern is generated in the resist. Real time feedback during the curing process of a resist being used in a volumetric AM printing process provides a major step forward in the build quality, resolution, repeatability and overall determinism, when manufacturing 3D structures, parts and components.

Figure 1:
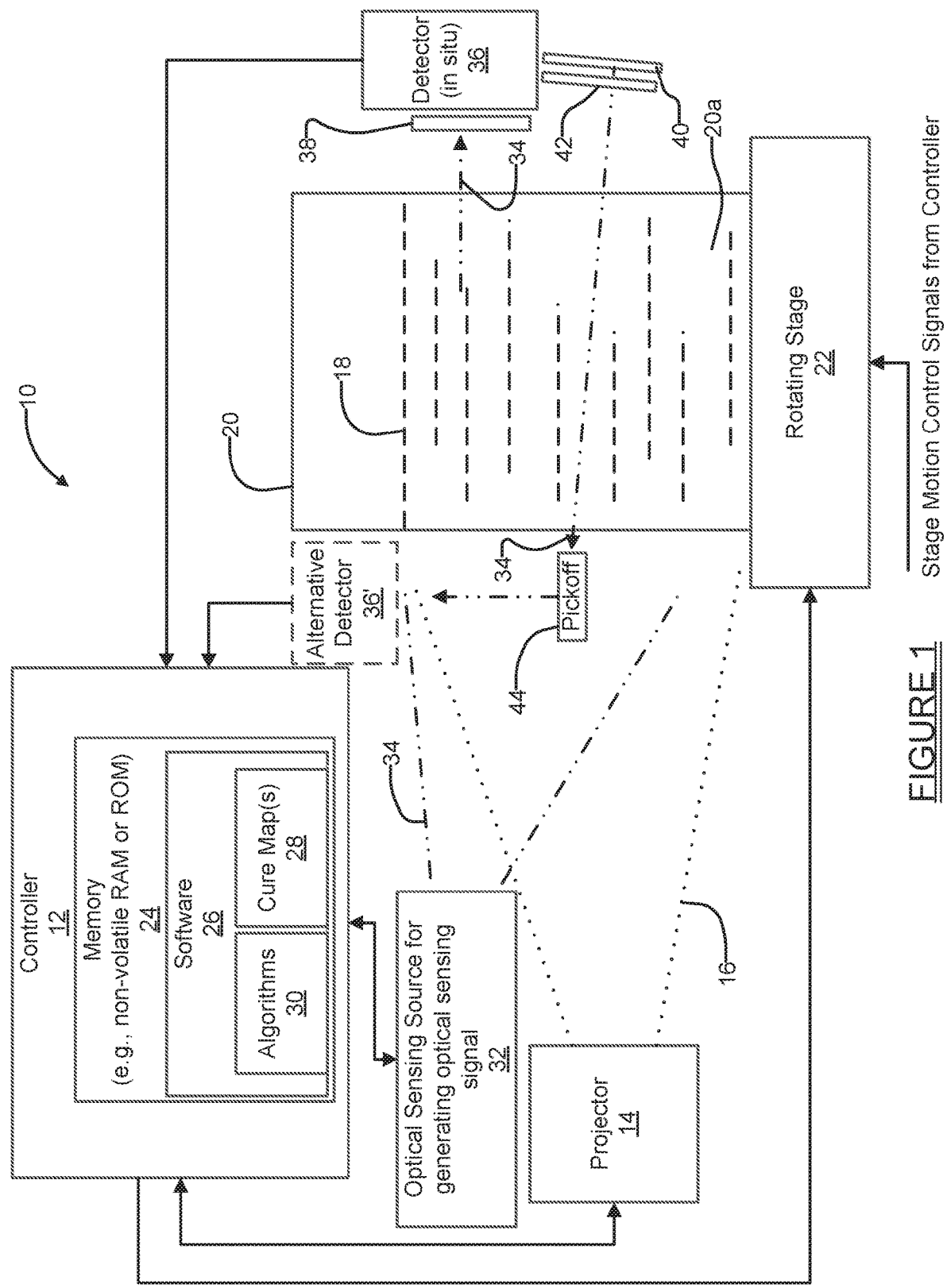
FIG. 1 is a high level block diagram of one embodiment of a volumetric 3D printing system incorporating a real time cure state sensing system in accordance with the present disclosure, and also showing a location of an alternative detector and related components for detecting an optical sensing signal used by the real time cure state sensing system.

FIG. 1 shows one embodiment 10 of a volumetric additive manufacturing (AM) system in accordance with the present disclosure. In this example the system 10 may include a controller 12 which controls operation of a light generating component 14. For convenience the light generating component 14 will be referred to throughout the following discussion as the "projector" 14. The projector 14 generates an optical curing beam 16 for curing a quantity of resist (e.g., photo-curable resin) 18 held within an optically transparent container 20. The optically transparent container defines a "build volume" 20a. The container 20 is rotated using a rotating stage 22 such that the curing beam 16 cures the volume of resist 18 in a single operation as the rotating stage 22 rotates. The projector 14 impresses the curing beam 16 with multiple 2D tomographic images that are projected, in sequential fashion, at the resist 18 as the rotating stage 22 is rotated to fully photo-cure and form a 3D part using the resist. Additional details of operation of a known, volumetric AM system may also be found in the papers cited hereinbefore.

In this example the controller 12 of the system 10 includes a memory 24 having a monitoring module, which in one example forms a software module 26 (hereinafter simply "software 26"). The software 26 may include one or more predetermined volumetric resist cure "maps" 28 in addition to algorithms 30 for analyzing cure data obtained during curing of the resist 18, and for recompiling sensing results into a 3D representation of the state of curing of the resist 18 within the build volume 20a. Collectively, the software 26 may be viewed as a software "module". The controller 12 uses the software 26 to help control curing of the resist 18, in situ, as the 3D part is being formed from the selective photo-curing of the resist 18. This important feature will be described in greater detail in the following paragraphs.

The system 10 differs from prior volumetric 3D printing systems in that at least one optical sensing source 32 is provided which projects an optical signal 34 for helping to monitor, in situ, a volumetric cure state or condition of the resist 18 as the 3D printing operation is carried out. In this regard a sensing wavelength is chosen for the optical signal 34 which is selected specifically for the material composition of the resist of interest. This selected wavelength has the characteristic that preferably shows poor absorption in the resist 18 when the resist is in an uncured state, but a significant increase in absorption of the optical signal 34 when the resist 18 is in the cured state. Such a wavelength could be identified or selected by looking at spectrographs of cured versus uncured resin. Such spectrographs are available in the public domain to designers and engineers in this industry. Such spectrographs may often show a tall and wide spike at a specific wavelength range corresponding to wavelengths which are absorbed strongly by the material. Absorption relative to a given resist composition can occur at different wavelengths, so more than one wavelength may be possible for use with a given resist composition. The particular selected wavelength for the optical signal 34 is also preferably chosen with cost and convenience of the sensing source 32 in mind in order to provide the sensing source 32 as a low cost, commercially obtainable element of the system 10.

The system 10 further includes a detector 36 which is positioned to receive the sensing signal 34 from the sensing source 34. In the embodiment shown in FIG. 1, the detector 36 is positioned on an opposite side of the container 20 relative to the positioning of the optical sensing source 32 and projector 14. Optionally, a filter 38 may be positioned in a line of sight between the detector 36 and the projector 14 to block out the curing beam 16 so the light from the curing beam does not contaminate the sensing results. The detector 36 may be, for example, a longwave infrared (IR) detector, or a visible light optical sensor.

It will be appreciated that while the components 28, 30, 32 and 36 are shown as part of an overall AM system, that the components 28, 30, 32 and 36 can be viewed as forming a separate cure monitoring control subsystem. In one form the cure monitoring control system forms a closed-loop cure monitoring feedback and control subsystem to monitor the cure process, to create the cure maps, and to provide feedback which enables modifying the curing beam 16 in real time to optimize curing of the resist 18 as the 3D part is made. The cure monitoring control subsystem could just as readily be provided as a fully separate subsystem and retrofitted into an existing volumetric 3D AM printing system. Both implementations (i.e., integrated part of an overall volumetric AM system, and retrofitted into an existing AM system) are contemplated by the present disclosure.

During the build process, the build volume 20a (i.e., defined by the container 20) is rotated and the image imprinted on the curing beam 16 by the projector 14 is changed synchronously with the build volume rotational angle. The sensing source 32 is positioned to illuminate the build volume 20a defined within the container 32, and projects the sensing signal 34 through the build volume, and thus through the resist 18, to the detector 36 as the build volume is rotated. The detector 36 captures optical signals as the curing beam 16 is illuminating the build volume 20a. The curing signals define a two dimensional attenuation map of the resist 18 during each image projected using the curing beam 16. These 2D attenuation map images are then "stacked up" using the algorithms 30 of the software 26 and reassembled via standard CT techniques into a full 3D volumetric map of attenuation representing the attenuation being experienced at all areas within the 3D build volume 20a. Since attenuation directly maps to the cure rate of the resist 18, a 3D volumetric map of cure state of the entire quantity of the resist 18, at a given point in time during the curing operation, can be generated using the software 26.

The controller 12 is able to use the measured (i.e., constructed) volumetric cure map by comparing it against the desired volumetric cure map 28 stored in the memory 24. This desired volumetric cure map will correspond to the desired 3D geometry of the part or component which the system 10 is being used to make. Differences between the measured and desired (i.e., stored, predetermined) volumetric cure maps are used to construct a 3D volumetric error map. This volumetric error map is then used by the controller 12 to modify the curing beam 16, and more specifically to modify the curing image(s) projected from the projector 14, in real time, to bring the error down to zero, or at least closer to zero.

It will be appreciated that the CT process used in a volumetric AM printing system requires many tomographic images to be sequentially projected from the projector 14 from a wide range of angles, generally 180° or 360° around the circumference of the build volume, in other words around a substantial portion of the circumference of the container 20. The optical sensing source 32 and the detector 36 are controlled with a suitable frequency or repetition rate so that they are able to collect the needed "stack" of images in a relatively short period of time relative to the full volumetric AM operation, so that a CT reconstruction can be generated in the software 26 before the full curing operation of the resist 18 is complete. The relative ratio of the time to generate the volumetric cure map compared to the time to fully cure the resist 18 determines the number of volumetric cure maps that can be created, and thus sets the feedback 'bandwidth' of the system 10. It is desired that many reconstructions (i.e., volumetric cure maps) be generated within a single build operation, for example between 10-100 or even more. The physical layout of the optical sensing source 32 and the detector 36 therefore plays an important role in determining the sensing imaging rate (i.e., number of sequential volumetric cure maps/comparisons) that can be carried out by the system 10.

FIG. 1 also shows how another embodiment of the system 10 may be constructed using a different placement for the detector 36. Detector 36' shown in FIG. 1 is instead placed on the same side of the container 20 as the projector 14, and a mirror 40 is placed on the opposing side of the container 20. A filter 42 may be placed in the optical path upstream of the mirror 40 to prevent the curing beam 16 from contaminating the reflected portion of the sensing signal 34 and adding error to the volumetric cure map being constructed. In this alternative configuration the optical signal 34 from the optical sensing source 32 is reflected by the mirror 40 back through the build volume 20a along the same optical path as the projected optical signal 34 from the sensing source 32. An optical pickoff 44, which may be a beam splitter (i.e., wavelength specific reflector) such as a dichroic mirror, may be arranged to pass the returning sensing light to the detector 36'. By this configuration, only the sensing signal 34 is able to pass unimpeded through the build volume 20a twice and back to the detector 36'. This detector configuration generates an image at the same rate as the curing is created.

It will be appreciated that at a minimum, CT requires one-half of a full rotation to generate a volumetric cure map. The build volume 20a must be rotated one-half of a full 360 degree rotation to collect this data, meaning that the cure operation also sees one-half of a full rotation. The relative rotational rates between sensing and curing may be coupled (i.e., the same), or in some embodiments it is possible that the rotational rates may be varied significantly. Tomographic reconstruction techniques typically require "M" rotations to cure, where "M" is typically on the order of 1-10, so several volumetric maps are typically generated during the course of a typical build operation for a given 3D part. In some applications, then, it may be difficult to reach the 10-100 number of rotations mentioned above for ideal mid-process imaging and feedback.

Figure 2:
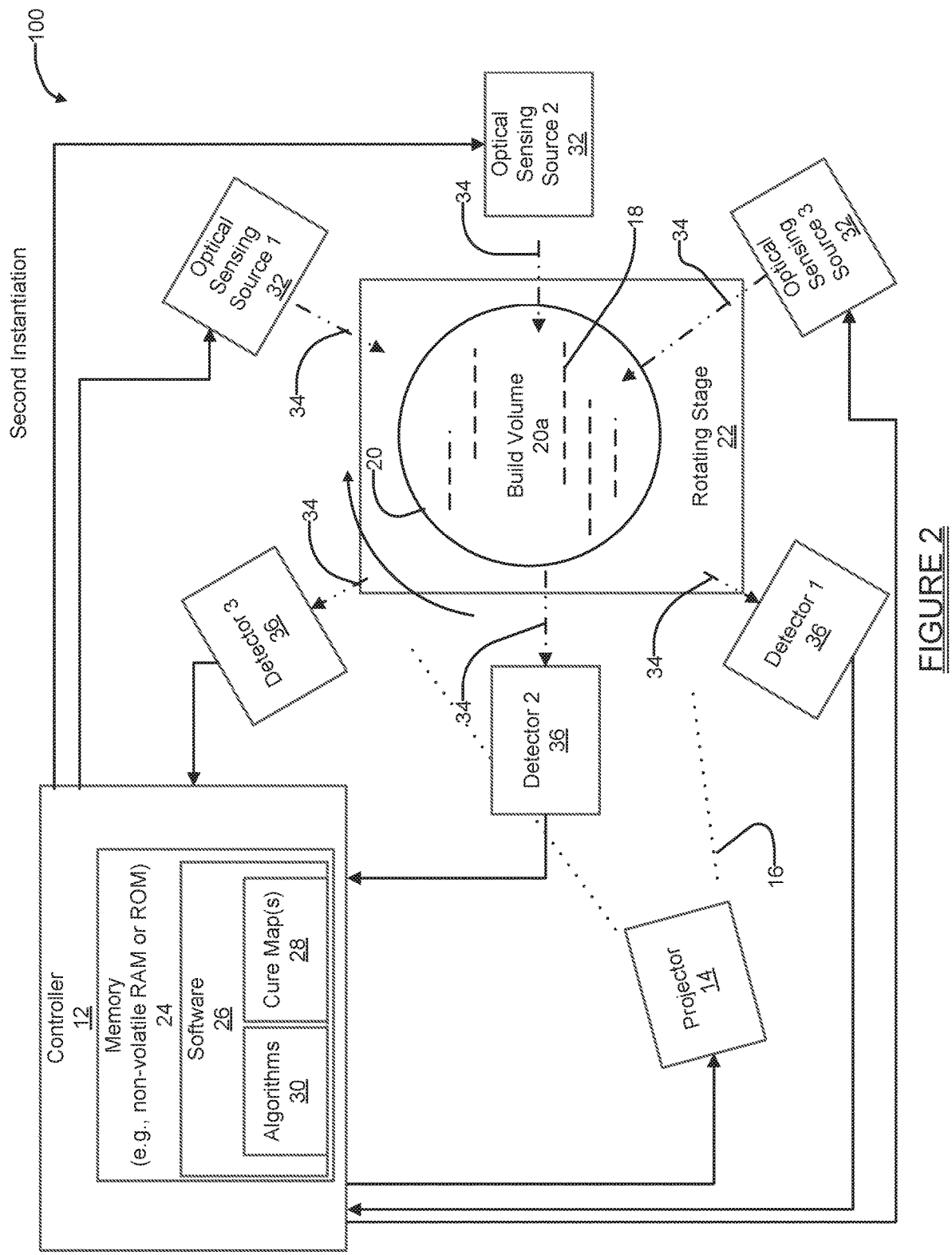
FIG. 2 is a another embodiment of a system of the present disclosure in which the system includes a plurality of fixedly supported optical sensing sources that each provide an optical sensing signal at a fixedly angular orientation through a resist within a build volume, to a single associated detector.

Referring to FIG. 2, a system 100 in accordance with a second embodiment of the present disclosure is presented. This embodiment is similar to the configuration of the system 10, but instead employs a plurality of optical sensing sources 32 arranged at different circumferential points around the build volume 20a, with several detectors 36 located on the opposite sides of these sources. This configuration thus creates several source/detector 32/36 pairs which are aligned with one another along a straight path. Still further, as another option, a single optical sensing source 32 could also be split to enter the build volume 20a from multiple angles through the use of one or more beam splitters, which split and direct portions of the optical signal 34 in different directions through the build volume 20a to different detectors 36 arranged circumferentially around the build volume. Such a variation would not require any change in the overall function of the system 10. In either embodiment, the multiple detectors 36 will effectively be sampling different angles of the build volume 20a simultaneously. The use of N different detectors 36 would mean that the build volume 20a would only need to rotated 1/N full rotations before a full rotation worth of cure attenuation images are collected. Thus, N volumetric cure maps can be created per rotation of the build volume 20a, and N*M volumetric cure maps can be created per build. The parallelization of the optical sensing source 32 and detector 36 layout thus provides a means to multiply the sensing rate relative to the build rate, and thus helps to facilitate reaching a target of 10-100 feedback maps, or at least getting closer to this target.

Figure 3:
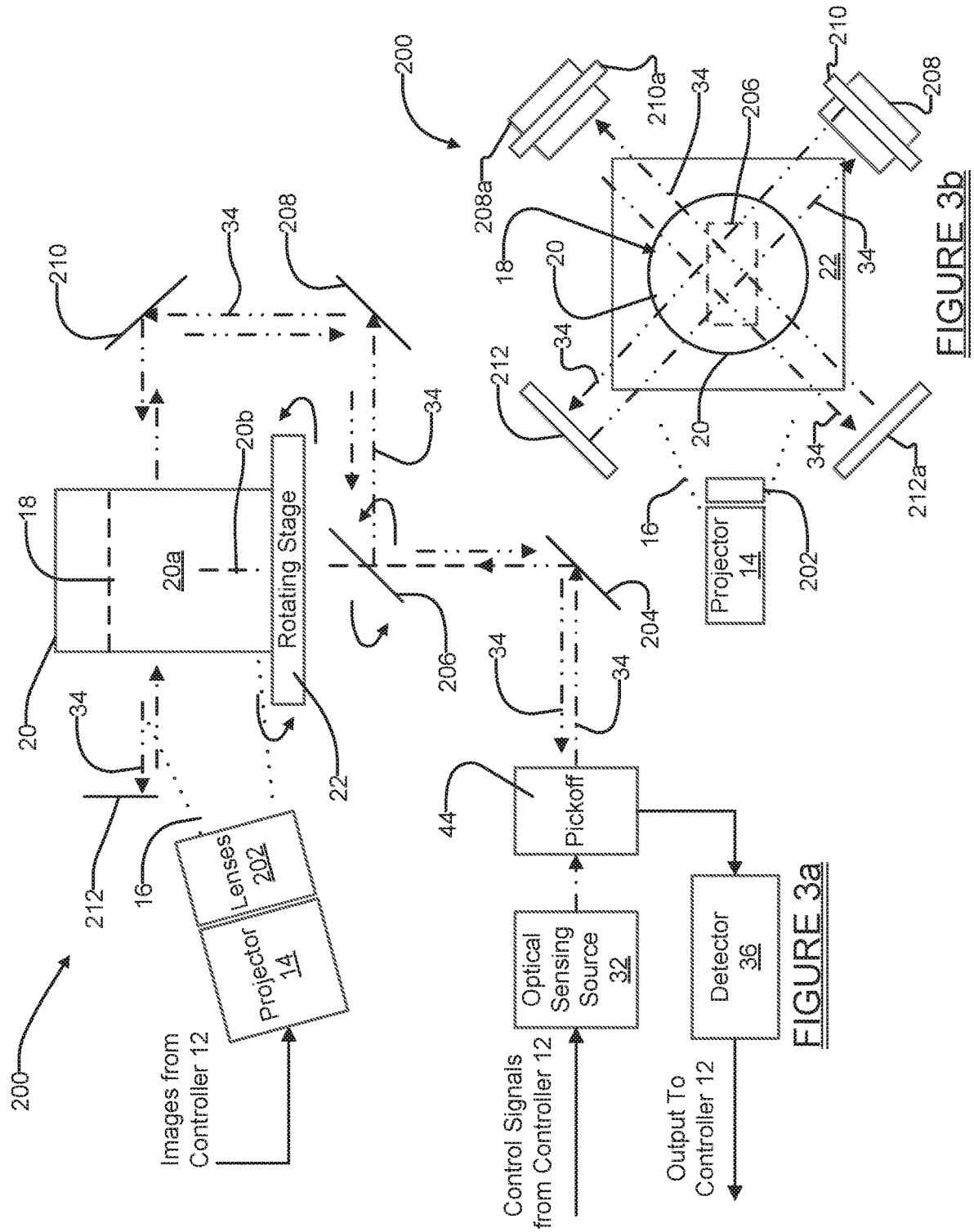
FIG. 3a shows another embodiment of the present disclosure where the optical sensing signal is routed by a network of fixedly disposed mirrors through an axial center of the build volume, and back through the resist, in somewhat of a "hook-shaped" path.
FIG. 3b is a top plan view of the system of FIG. 3a showing two groups of mirrors arranged at different, fixed angular orientations around the build volume.

FIG. 3a shows still another embodiment 200 of the present disclosure in which the projector 14 is arranged to direct a signal through lenses 202 for aberration correction, and through the optical pickoff 44 to a first fixedly mounted mirror 204. The fixedly mounted mirror 204 is positioned below an axial center of the container 20. The mirror reflects the optical sensing signal 34 up towards the container 20 where it is turned 90 degrees by a second rotating mirror 206. The second mirror rotates within a horizontal plane (i.e., a plane parallel to that within which the rotating stage 22 resides in) about the axial center 20b of the container 20. A conventional motor (not shown) controlled by the controller 12 may be used to control rotational motion of the mirror 206. Rotation of the mirror 206 enables the sensing signal to be reflected in different directions within a plane parallel to the rotating stage 22. In this example a second fixed mirror 208 and a third fixed mirror 210 are used to reflect the optical sensing signal to a fixed reflector 212 disposed perpendicular to the plane of the rotating stage 22 (i.e., a plane parallel to the sidewall of the container 20). The optical sensing signal 34 thus passes completely through the resist 18 in a first direction before being reflected by the fixed reflector 212 back through the resist 18 in the opposite direction to make a second pass through the build volume 20a. The optical sensing signal 34 is then reflected by the mirrors 210, 208 and 206 and 204 back toward the optical pickoff 44 where it redirected to the detector 36.

FIG. 3a shows a portion of the system 200 from a top plan view to illustrate how multiple groups of mirrors 208/210/212 and 208a/210a/212a can be used to reflect the optical sensing signal 34 through the build volume 20a at different angular orientations. The rotating mirror 206 is controlled to alternately align its axis of projection with either mirror 208 or mirror 210, which produces the different angular projections of the optical sensing signal 34 through the build volume 20a. While only two groups of fixed mirrors 208/210/212 and 208a/210a/212a are shown in FIG. 3a angular arranged about 90 degrees from one another, in practice three, four or more separate groups of mirrors 208/210/212 may be incorporated and arranged at different angular orientations around the build volume 20a. The optical sensing signal 34 is sequentially reflected to each of the mirrors 208 as the mirror 206 rotates. For example, the system 200 may be configured to enable the optical sensing signal 34 to be routed in along six different approach angles of 0, 30, 60, 90, 120, 150 and degrees.

There is no need to do a 180 degree measurement about the build volume 20a since that produces an identical image to the 0 degree measurement. The lenses 202 will in most instances be desired to remove the distortion effect of the circular container, for example as shown in Loterie et al. (referenced hereinabove).

The system 200 of FIGS. 3a and 3b thus form the optical path for the sensing signal 34 into a "hook-like" pattern with the long part of the hook on the rotational axis of the build volume 20a. This allows just the mirror(s) to be rotated while the expensive sensing source 32, its associated optics and the detector 14 can all remain stationary.

The system 200 of FIGS. 3a and 3b enables gathering an attenuation map from a plurality of different "faces" of the container 20. The switching of the optical path along which the sensing signal 34 is transmitted may be done at a high rate, for example every tenth of a second, enabling measurements to be made very close to one another. The obtained measurements correspond to attenuation maps with very small angle differences, thus providing a high resolution volumetric intensity map. In this example the system 200 would provide a 5× multiplier in the rate of acquisition of the volumetric curing map over the first embodiment of the system 10 discussed in FIG. 1. An even higher number of distinct optical paths could be used as desired to even further boost the rate multiplier.

Figure 4:
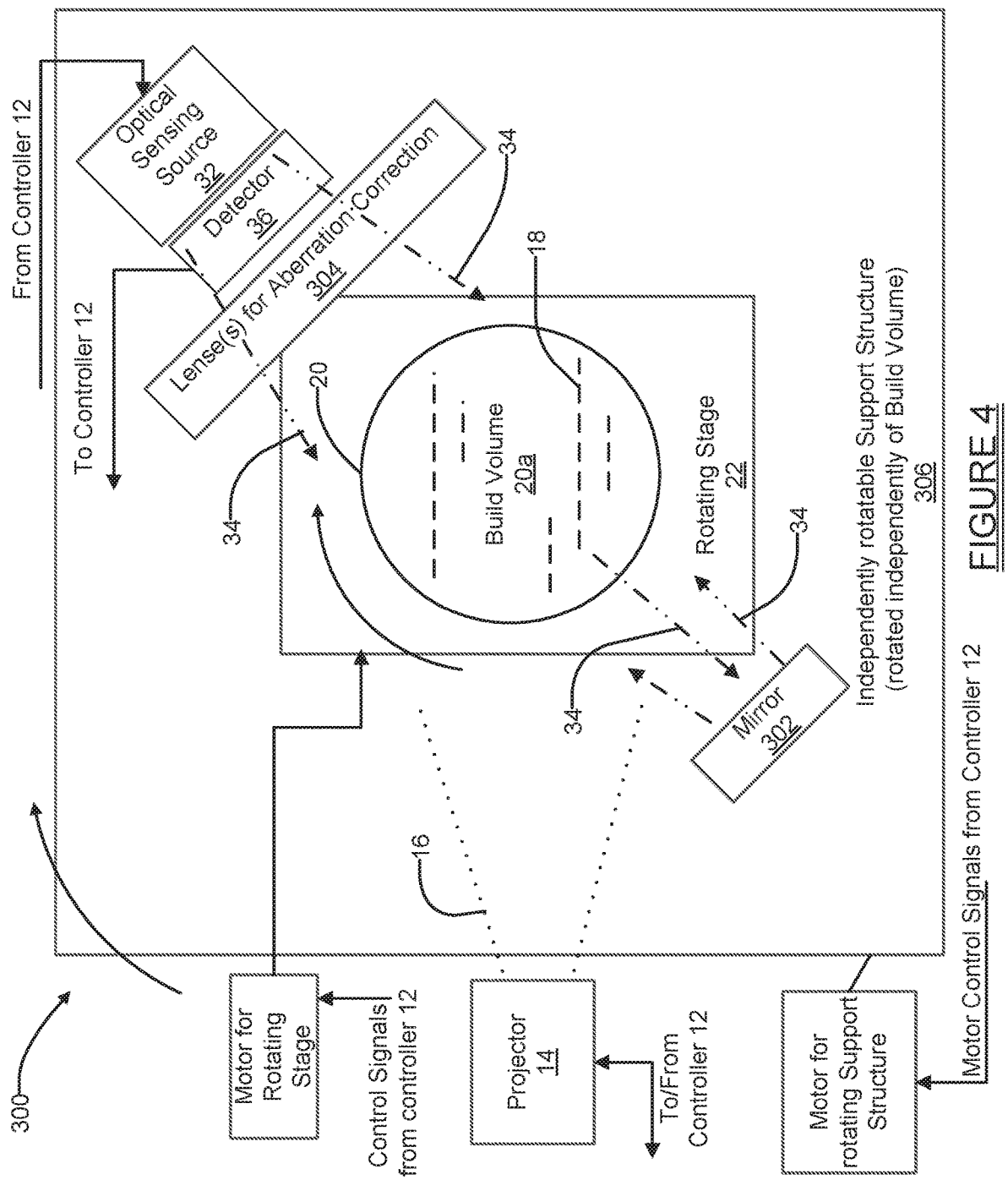
FIG. 4 is a high level block diagram of another embodiment of the present disclosure in which all of the optical sensing components are located on a separate, rotated support structure, and rotated a predetermined angular amount around the build volume, independent of rotation of the rotating stage, during a build operation.

In still another embodiment, a system 300 is disclosed in FIG. 4 where the sensor sensing source 32 and the detector 36 are placed on the same optical path, with a mirror 302 on the opposite side of the build volume 20a. A series of lenses 304 are used to remove aberration due to passage through the circular build volume 20a container 20. But instead of optically rerouting the path of the optical sensor signal 34 to different orientations relative to the build volume 20a stage 22, in this embodiment the whole sensing subsystem including the sensing source 32, detector 36, mirror 302 and lenses 304 is mechanically rotated on a single support structure 306. The support structure 306 is independently movable relative to the rotating stage 22 (and thus relative to the build volume 20a). A volumetric cure map image may be created each time the components 32/36/302/304 of the sensing subsystem complete a full rotation around the build volume 20a. The rotational rate for tomographic AM is generally kept low to avoid dynamically disturbing the resist 18. But if the only rotating elements are an exterior set of mirrors, the spinning rate no longer has such constraints. The sensing and curing operation could thus be spun around the build volume 20a at a rate sufficiently high to capture the desired number of volumetric cure maps, but slow enough to work with the refresh rate of the curing image sensing source 32. This may be an especially desirable embodiment as it only requires the minimum number of sources and detectors but provides a means to reach the high volumetric cure map capture rates.

Another variation of the system 300 forms an embodiment where not all of the optical sensing components are rotated. Instead, the optical path could be pointed down along the rotational axis of the build volume 20a where it bounces off a rotating right angle mirror, like that shown in FIGS. 3a and 3b. The rotating mirror may be placed on a spinning support frame which has several mirrors to guide the optical path off the rotational axis, out radially from the axis, down parallel to the rotational axis, and then back radially through the build volume, and off the reflector on the other side of the build volume 20a. This design differs from the previous one only in that the active electronics (sensor source and detector) are stationary, but still couple into a rotating sensing frame that is moving around the build volume. The rotating mirror system would occlude the curing laser optical path twice per rotation, so the curing system would need to be synchronized to not attempt to cure during that brief period.

Figure 5:
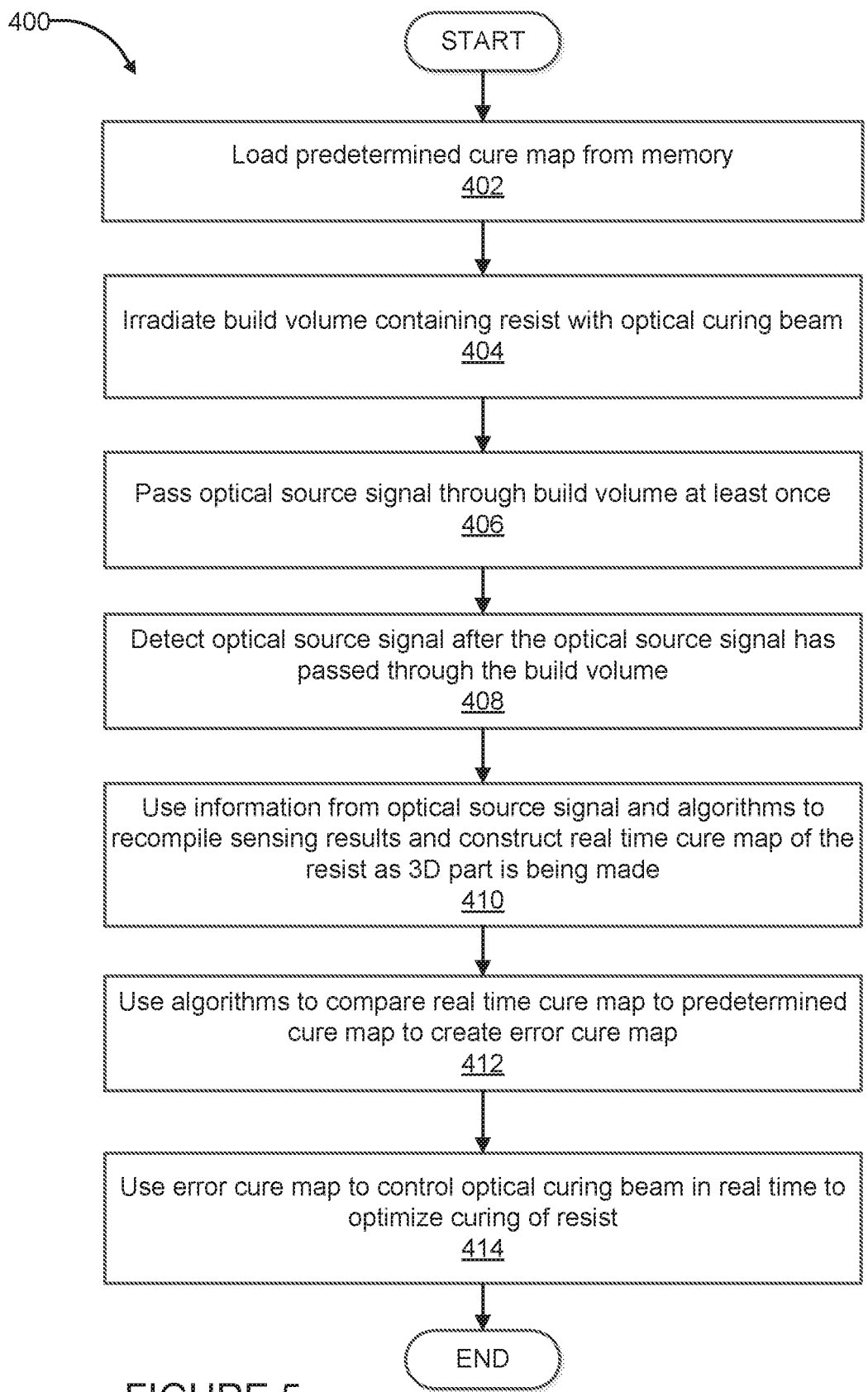
FIG. 5 is a high level flowchart summarizing operations that may be performed by one or more of the embodiments of the present disclosure.

Referring briefly to FIG. 5, a high level flowchart 400 is shown illustrating operations that one or more of the various embodiments of the present disclosure may perform. Initially at operation 402 at least one predetermined cure map 28 may be loaded from memory 24 by the controller 12. At operation 404 the build volume 20a is irradiated with the optical curing beam 16. At operation 406 the optical source signal 34 is passed through the build volume 20a at least one. Optionally, the optical source signal 34 may be passed through the build volume 20a two or more times. At operation 408 at least one detector 36 is used to detect the optical source signal 34 after it has passed through the build volume 20a. At operation 410 the controller 12 may use information from the detected optical source signal 34, for example absorption caused by the real time cure state of the resist 18, to construct a real time cure map of the resist as the 3D part is being formed from the resist. At operation 412 the controller 12 may use the algorithms 20 to compare the real time cure map to the predetermined cure map 28 and to create an error cure map from the comparison. The error cure map is indicative of undesirable variations in the curing state of the resist 18 at one or more 3D locations within the resist. At operation 414, the controller 12 uses the error cure map to adjust the curing beam 16, for example by increasing or reducing a power level associated with the curing beam 16, in a manner to help optimize the curing of the resist 18. Again, this happens in situ, in real time, while the 3D part is being formed. Operations 406-414 preferably occur repeatedly as the build volume 20a is rotated so that a plurality of "samples" of the detected optical signal 34 are collected to construct the cure map, and then the error cure map. It will also be appreciated that the above described operation shown in FIG. 5 may be modified depending on which of the various embodiments of FIGS. 1-4 are employed, and that certain steps may be performed in a slightly different order, or possibly more than once, before proceeding to a subsequent step.

The foregoing description of the various embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. An in situ cure monitoring control system for use with a volumetric three dimensional (3D) printing system, wherein the volumetric 3D system includes a container defining a build volume, the container including a photocurable resist used for making a 3D part, and the resist being responsive to an optical curing beam from a light source which is controlled by a controller, and which is passed through the resist, the cure monitoring control system comprising:

an optical signal source configured to generate and project optical signals into a first side of the container, and through the first side of the container into a first surface of the resist, and fully through the resist to a second surface of the resist and then through a second side of the container different from the first side, the optical signals having a wavelength selected in relation to a characteristic of the resist such that the optical signals experience a first level of absorption when passing fully through the resist and when the resist is uncured, and a second level of absorption which is different than the first level of absorption when passing fully through the resist from the first surface to the second surface after the resist is cured, the optical signals being directed to pass fully through the resist, representing the build volume, from the first surface to the second surface as the curing beam is also passing through the resist;

a detector configured to receive the optical signals after the optical signals have passed fully through the resist and through the second side of the container, and to generate output signals in accordance therewith; and a monitoring module configured to communicate with the controller, and to monitor the output signals and to use the output signals to modify the curing beam to help optimize curing of the resist.

2. The system of claim 1, wherein the monitoring module includes a software module which is loaded into a memory of the volumetric 3D printing system, and which is used by the controller of the volumetric 3D printing system.

3. The system of claim 1, further comprising a support structure on which the optical signal source and the detector are supported; and wherein the support structure is rotated to move the optical signal source and the detector angularly about the build volume as the optical signals are passed through the build volume.

4. The system of claim 1, wherein the detector and the optical signal source are mounted stationary relative to the build volume.

5. The system of claim 4, wherein the monitoring module uses the output of the detector to construct a real time cure map of the resist as the 3D part is being formed.

6. The system of claim 5, wherein the monitoring module includes a predetermined cure map for the resist, and the monitoring module includes a software module which is configured to:

compare the real time cure map with the predetermined cure map;

to construct an error cure map from the differences between the real time cure map and the predetermined cure map; and to use the error cure map to control the curing beam to modify curing of the resist in real time.

7. The system of claim 1, wherein the cure monitoring control system comprises:

a plurality of optical signal sources for projecting optical signals at different angular orientations through the build volume.

8. The system of claim 1, wherein the cure monitoring control system comprises:

a plurality of optical signal sources for generating optical signals projected through the resist;

a plurality of detectors, with each said detector being configured to receive an associated one of the optical signals after the associated one of the optical signals has passed through the resist; and the plurality of detectors each being configured to communicate output signals to the controller, the output signals being indicative of a real time characteristic of the resist during curing of the resist.

9. The system of claim 1, wherein the cure monitoring control system further comprises:

a support structure for supporting the optical signal source and the detector in a fixed relationship to one another; and the support structure being rotatable relative to the build volume such that the optical source and the detector are moved in synchronous fashion with one another around the build volume during curing of the resist.

10. A volumetric three dimensional (3D) printing system comprising:

a controller;

a container defining a build volume for holding a quantity of optically curable resist used to form a 3D component;

a rotatable stage for supporting the container and rotating the container;

an optical signal source controlled by the controller, which generates an optical curing beam which is projected through the resist, wherein the optical curing beam is adapted to project a plurality of two dimensional (2D) images for selectively photo-curing the resist to form the 3D component; and a cure monitoring control subsystem having an optical sensing beam source and configured to:

communicate with the controller and to project an optical sensing beam into a first side of the container, the optical sensing beam passing through a full thickness of the resist to, and through, a second side of the container opposite the first side, the optical sensing beam having a wavelength such that it experiences a first level of absorption when passing fully through the resist from the first side to the second side of the container when the resist is in an uncured state, and experiences a second level of absorption which is different than the first level of absorption when passing fully through the resist from the first side to the second side of the container after the resist is cured; and use a detector configured to receive the optical sensing beam after the optical sensing beam has passed fully through the resist and through the second side of the container, and to use the received optical sensing beam for in situ monitoring a curing of the resist and generating data to:

modify the optical curing beam to help control curing of the 3D component;

and to create a real time, 3D volumetric cure map of a cure state of an entire quantity of the resist after the 3D component is fully formed using the resist.

11. The system of claim 10, wherein the detector provides an output indicative of a characteristic of the resist during curing of the resist.

12. The system of claim 11, wherein the cure monitoring feedback and control subsystem includes a software module for using the output of the detector to construct the real time, 3D volumetric cure map of the resist as the 3D component is being formed.

13. The system of claim 12, wherein the software module of the cure monitoring and feedback control subsystem is configured to:

compare the 3D volumetric cure map with a predetermined cure map as the 3D volumetric cure map is being created;

to construct an error cure map from the differences between the real time, 3D volumetric cure map and the predetermined cure map as the real time 3D volumetric cure map and the predetermined cure map are being compared during curing of the resist; and to use the error cure map to further control the curing beam to modify curing of the resist in real time.

14. The system of claim 10, wherein the cure monitoring control system comprises:
- a plurality of additional optical sensing signal sources for generating additional optical sensing beams projected through the resist, and used to indicate a characteristic of the resist as the resist is being cured;
- a plurality of additional detectors, with each one of said additional detectors being configured to receive an associated one of the additional optical sensing beams after the each one of the additional optical sensing beams has passed through the resist;
- the plurality of additional detectors each being configured to communicate output signals to the controller, the output signals being indicative of a real time characteristic of the resist during curing of the resist; and
- wherein the optical signal source, the additional plurality of optical signal sources, the detector and the additional plurality of detectors are all configured to be stationary relative to the build volume.

15. The system of claim 10, wherein the cure monitoring control system comprises:
- a support structure for supporting the optical sensing beam source and the detector in a fixed relationship to one another; and
- the support structure being rotatable relative to the build volume such that the optical sensing beam source and the detector are moved in synchronous fashion with one another around the build volume during curing of the resist.

16. The system of claim 10, wherein the cure monitoring control system includes:
- a software module configured to analyze an absorption of the optical curing beam by the resist in real time as the resist is being cured by the optical curing beam.

17. A method for controlling, in situ, curing of a resist being used to form a three dimensional (3D) part through a volumetric three dimensional (3D) printing operation, the method comprising:
- projecting an optical signal from an optical source disposed through a first side of a container containing the resist, wherein the resist defines a build volume, and fully through the build volume and then through a second side of the container different from the first side;
- detecting the optical signal after the optical signal has passed fully through the build volume and through the second side of the container, while the resist is being cured using a curing beam being projected through the resist, wherein the optical signal has a wavelength such that it experiences a first level of absorption when passing fully through the resist from the first side to the second side of the container when the resist is in an uncured state, and a second level of absorption which is different than the first level of absorption when passing fully through the resist from the first side to the second side of the container, after the resist is cured;
- analyzing a characteristic of the detected optical signal in real time to determine how curing of the resist is proceeding; and
- using the analysis of the characteristic of the detected optical signal to modify a property of the curing beam in real time to help optimize curing of the resist.

18. An in situ cure monitoring control system for use with a volumetric three dimensional (3D) printing system, wherein the volumetric 3D system includes a container defining a build volume, the container including a photocurable resist used for making a 3D part, and the resist being responsive to an optical curing beam from a light source which is controlled by a controller, and which is passed through the resist, the cure monitoring control system comprising:
- an optical signal source configured to generate optical signals having a wavelength selected in relation to a characteristic of the resist, such that the optical signals experience a first level of absorption when passing through the resist when the resist is uncured, and a second level of absorption which is greater than the first level of absorption, when passing through the resist after the resist is cured, the optical signals being directed to pass through the build volume as the curing beam is also passing through the resist;
- a detector for detecting the optical signals after the optical signals have passed through the resist and generating output signals in accordance therewith, the detector and the optical signal source being mounted stationary relative to the build volume; and
- a monitoring module configured to communicate with the controller, and to monitor the output signals and to use the output signals to modify the curing beam to help optimize curing of the resist;
- the monitoring module configured to use the output of the detector to construct a real time cure map of the resist as the 3D part is being formed;
- the monitoring module further including a predetermined cure map for the resist, and configured to:
  - compare the real time cure map with the predetermined cure map;
  - to construct an error cure map from a differences between the real time cure map and the predetermined cure map; and
  - to use the error cure map to control the curing beam to modify curing of the resist in real time.

19. An in situ cure monitoring control system for use with a volumetric three dimensional (3D) printing system, wherein the volumetric 3D system includes a container defining a build volume, the container including a photocurable resist used for making a 3D part, and the resist being responsive to an optical curing beam from a light source which is controlled by a controller, and which is passed through the resist, the cure monitoring control system comprising:
- an optical signal source configured to generate and project optical signals into a first side of the container, and through the first side of the container into a first surface of the resist, and fully through the resist to a second surface of the resist, the optical signals having a wavelength selected in relation to a characteristic of the resist, such that the optical signals experience a first level of absorption when passing fully through the resist when the resist is uncured, and a second level of absorption which is different than the first level of absorption when passing fully through the resist after the resist is cured;
- a detector configured to receive the optical signals after the optical signals have passed fully through the resist and to generate output signals in accordance therewith; and
- a monitoring module configured to communicate with the controller, and to monitor the output signals and to use the output signals to modify the curing beam to help optimize curing of the resist;
- the monitoring module further including a predetermined cure map for the resist, and configured to:
  - use the output of the detector to construct a real time cure map of the resist as the 3D part is being formed;

compare the real time cure map with the predetermined cure map;
construct an error cure map from the differences between the real time cure map and the predetermined cure map; and
use the error cure map to control the curing beam to modify curing of the resist in real time.

\* \* \* \* \*